United States Patent
Kwon et al.

(10) Patent No.: US 10,056,581 B2
(45) Date of Patent: Aug. 21, 2018

(54) SECONDARY BATTERY

(71) Applicant: Samsung SDI Co., Ltd., Yongin-si, Gyeonggi-do (KR)

(72) Inventors: Doyeon Kwon, Yongin-si (KR); Daeyon Moon, Yongin-si (KR); Sanghyuk Eo, Yongin-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 245 days.

(21) Appl. No.: 14/947,967

(22) Filed: Nov. 20, 2015

(65) Prior Publication Data

US 2016/0156001 A1     Jun. 2, 2016

(30) Foreign Application Priority Data

Nov. 28, 2014 (KR) .................. 10-2014-0169173

(51) Int. Cl.
   *H01M 2/06* (2006.01)
   *H01M 2/04* (2006.01)

(52) U.S. Cl.
   CPC ........ *H01M 2/06* (2013.01); *H01M 2/0469* (2013.01); *H01M 2/0404* (2013.01); *H01M 2220/30* (2013.01)

(58) Field of Classification Search
   CPC ........ H01M 2/06; H01M 2/04; H01M 2/0469; H01M 2/0404; H01M 2220/30
   See application file for complete search history.

(56) References Cited

U.S. PATENT DOCUMENTS

| | | | | |
|---|---|---|---|---|
| 2008/0280200 A1* | 11/2008 | Takahashi | ........... | H01M 2/1061 429/179 |
| 2010/0086845 A1* | 4/2010 | Jung | ................... | H01M 2/0215 429/178 |
| 2012/0171557 A1* | 7/2012 | Ahn | ....................... | H01M 2/021 429/179 |
| 2013/0059198 A1* | 3/2013 | Takahashi | ........... | H01M 2/1061 429/179 |
| 2014/0072847 A1* | 3/2014 | Moon | ................... | H01M 2/204 429/90 |

FOREIGN PATENT DOCUMENTS

| | | | |
|---|---|---|---|
| JP | 2006-164559 A | 6/2006 | |
| JP | 2006-164601 A | 6/2006 | |

(Continued)

OTHER PUBLICATIONS

Decision to Grant Patent issued to KIPO dated Jul. 27, 2016.*

(Continued)

*Primary Examiner* — Alex Usyatinsky
(74) *Attorney, Agent, or Firm* — Knobbe Martens Olson & Bear LLP

(57) ABSTRACT

A secondary battery is disclosed. In one aspect, the secondary battery includes a battery cell including an electrode, a cap cover placed over the battery cell and having an opening that exposes the electrode, and a connection member placed over the cap cover and electrically connected to the electrode. The battery also includes at least one guide accommodating the connection member, wherein the guide protrudes upwardly from the cap cover and extends in a length direction of the connection member.

24 Claims, 4 Drawing Sheets

(56) References Cited

FOREIGN PATENT DOCUMENTS

| | | | |
|---|---|---|---|
| JP | 2009-076268 A | | 4/2009 |
| JP | 2009-087554 A | | 4/2009 |
| JP | 2009076268 | * | 4/2009 |
| JP | 2011-096434 A | | 5/2011 |
| KR | 10-2008-0040581 A | | 5/2008 |
| KR | 10-2014-0034390 A | | 3/2014 |

OTHER PUBLICATIONS

Korean Office Action dated Jan. 21, 2016 for Korean Patent Application No. KR 10-2014-0169173 which corresponds to subject U.S. Appl. No. 14/947,967.
Korean Registration Determination Certificate dated Jul. 7, 2016 for Korean Patent Application No. KR 10-2014-0169173, and from which subject U.S. Appl. No. 14/947,967 claims priority.

* cited by examiner

SECONDARY BATTERY

INCORPORATION BY REFERENCE TO ANY PRIORITY APPLICATIONS

This application claims the benefit of Korean Patent Application No. 10-2014-0169173, filed on Nov. 28, 2014, in the Korean Intellectual Property Office, the disclosure of which is incorporated herein in its entirety by reference.

BACKGROUND

Field

The described technology generally relates to a secondary battery.

Description of the Related Technology

With the advent of wireless Internet and communication technology, there has been increasing use of electronic devices such as cellular phones or portable computers equipped with secondary, or rechargeable, batteries. These devices can be used anywhere without the need for constant access to power outlets.

SUMMARY OF CERTAIN INVENTIVE ASPECTS

One inventive aspect is a secondary battery configured to firmly maintain the position of a connection member electrically connected to a battery cell so as to eliminate the tape, and attaching step, for fixing the connection member.

Another aspect is a secondary battery that includes: a battery cell including an electrode; a cap cover placed on the battery cell and including an opening that exposes the electrode; a connection member placed on the cap cover and electrically connected to the electrode; and guides protruding upward from the cap cover and extending in a length direction of the connection member for guiding the connection member.

The guides can be formed as a pair on both sides of the cap cover to receive the connection member therebetween.

The guides can include first guides and second guides that are separate from each other in the length direction of the connection member.

Recesses can be formed in lateral sides of the connection member at positions facing the guides such that the recesses and the guides are engaged with each other.

The electrode can include first and second electrodes formed on an upper surface of the battery cell and having different polarities.

The connection member can include first and second connection members electrically connected to the first and second electrodes, respectively.

The first and second connection members can overlap each other on the cap cover and can extend in parallel with each other while being guided by the guides.

The guides can be formed on both sides of the cap cover to receive at least one of the first and second connection members therebetween.

The opening can include first and second openings through which the first and second electrodes are respectively exposed.

A temperature-sensing element can be placed between the first electrode and the first connection member, and the cap cover can further include a third opening that exposes the temperature-sensing element.

The guides can include: first guides formed between the third opening and an end portion of the cap cover; and second guides formed between the first and second openings.

The first guides can guide the first connection member electrically connected to the temperature-sensing element exposed through the third opening, and the second guides can guide the second connection member electrically connected to the second electrode exposed through the second opening.

The first guides can guide the first connection member and the second connection member placed on top of the first connection member in an overlapping manner.

Another aspect is a secondary battery comprising a battery cell including an electrode, a cap cover placed over the battery cell and having an opening that exposes the electrode, a connection member placed over the cap cover and electrically connected to the electrode, and at least one guide accommodating the connection member, wherein the guide protrudes upwardly from the cap cover and extends in a length direction of the connection member.

In the above secondary battery, the guide is formed on opposing sides of the cap cover so as to accommodate the connection member therebetween.

In the above secondary battery, the guides comprise a plurality of first guides and a plurality of second guides that are respectively separate from each other in the length direction of the connection member.

In the above secondary battery, the connection member has lateral sides having at least one recess facing the guide such that the recess and the guide are engaged with each other.

In the above secondary battery, the battery cell has an upper surface, wherein the electrode comprises first and second electrodes formed over the upper surface and having different polarities.

In the above secondary battery, the connection member comprises first and second connection members electrically connected to the first and second electrodes, respectively.

In the above secondary battery, the first and second connection members overlap each other and extend in parallel with each other.

In the above secondary battery, the guide is formed on opposing sides of the cap cover so as to accommodate at least one of the first and second connection members therebetween.

In the above secondary battery, the opening comprises first and second openings that respectively expose the first and second electrodes.

The above secondary battery further comprises a temperature sensor placed between the first electrode and the first connection member, wherein the cap cover has a third opening that exposes the temperature sensor.

In the above secondary battery, the cap cover includes an end portion, wherein the guide comprises at least one first guide formed between the third opening and the end portion of the cap cover and at least one second guide formed between the first and second openings.

In the above secondary battery, the first guide accommodates the first connection member electrically connected to the temperature sensor, wherein the second guide accommodates the second connection member electrically connected to the second electrode exposed through the second opening.

In the above secondary battery, the first guide further accommodates the second connection member.

Another aspect is a secondary battery comprising a battery cell including an electrode and a cap cover placed over the battery cell and having an opening that exposes the electrode, wherein the cap cover includes at least one guide protruding upwardly from the cap cover and extending in a length direction of the cap cover. The secondary battery also comprises at least one connection member placed over the cap cover and electrically connected to the electrode, wherein the connection member is at least partially accommodated in and supported by the guide.

In the above secondary battery, the cap cover includes first and second surfaces opposing each other, wherein the first surface faces the battery cell, and wherein the guide protrudes upwardly from different portions of the second surface of the cap cover.

In the above secondary battery, the guide includes a first pair of guides and a second pair of guides spaced apart from each other.

In the above secondary battery, the length of the second pair of guides is greater than that of the first pair of guides.

In the above secondary battery, the connection member comprises first and second connection members spaced apart from each other and respectively supported by the first and second pairs of guides.

In the above secondary battery, at least one opening is formed between the first and second pairs of guides.

In the above secondary battery, the connection member has at least one recess facing the guide such that the recess and the guide are engaged with each other.

DETAILED DESCRIPTION OF CERTAIN INVENTIVE EMBODIMENTS

Figure 1:
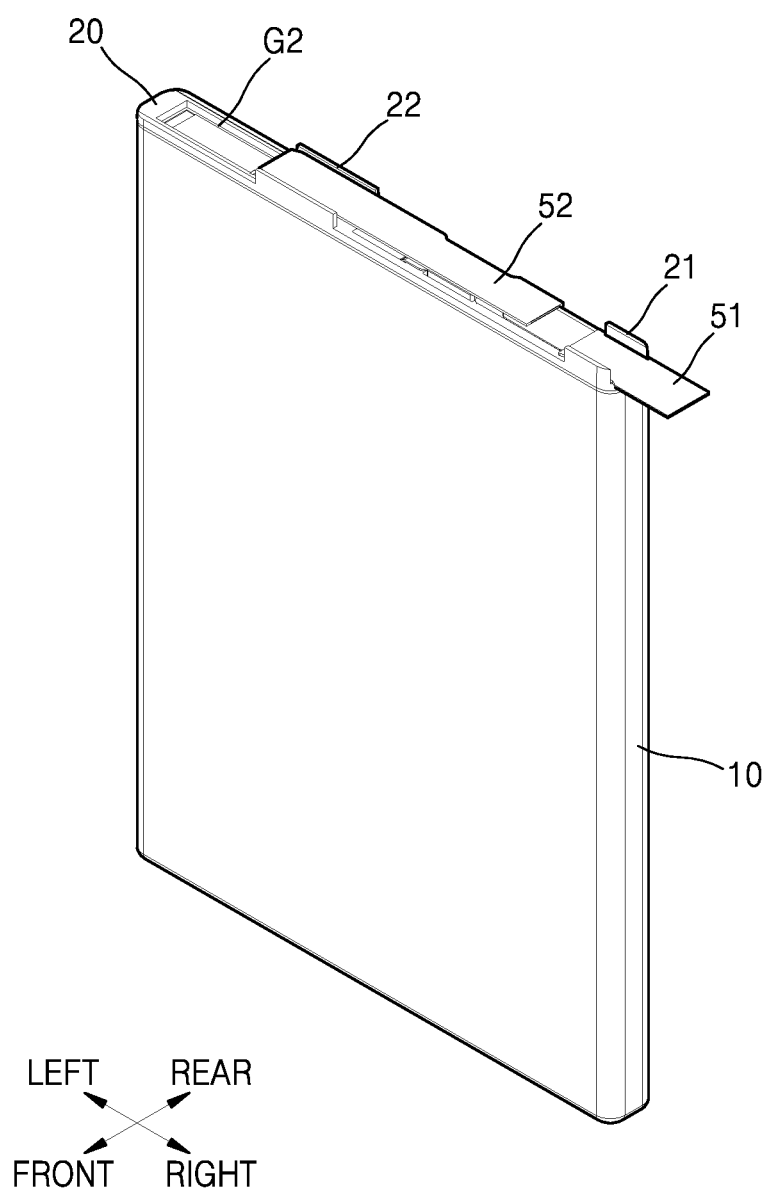
FIG. 1 is a perspective view illustrating a secondary battery according to an exemplary embodiment.

Reference will now be made in detail to exemplary embodiments, examples of which are illustrated in the accompanying drawings, wherein like reference numerals refer to like elements throughout. In this regard, the present exemplary embodiments can have different forms and should not be construed as being limited to the descriptions set forth herein. Accordingly, the exemplary embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Secondary batteries will now be described in detail with reference to the accompanying drawings, in which exemplary embodiments are shown. In this disclosure, the term "substantially" includes the meanings of completely, almost completely or to any significant degree under some applications and in accordance with those skilled in the art. Moreover, "formed on" can also mean "formed over." The term "connected" can include an electrical connection.

Figure 2:
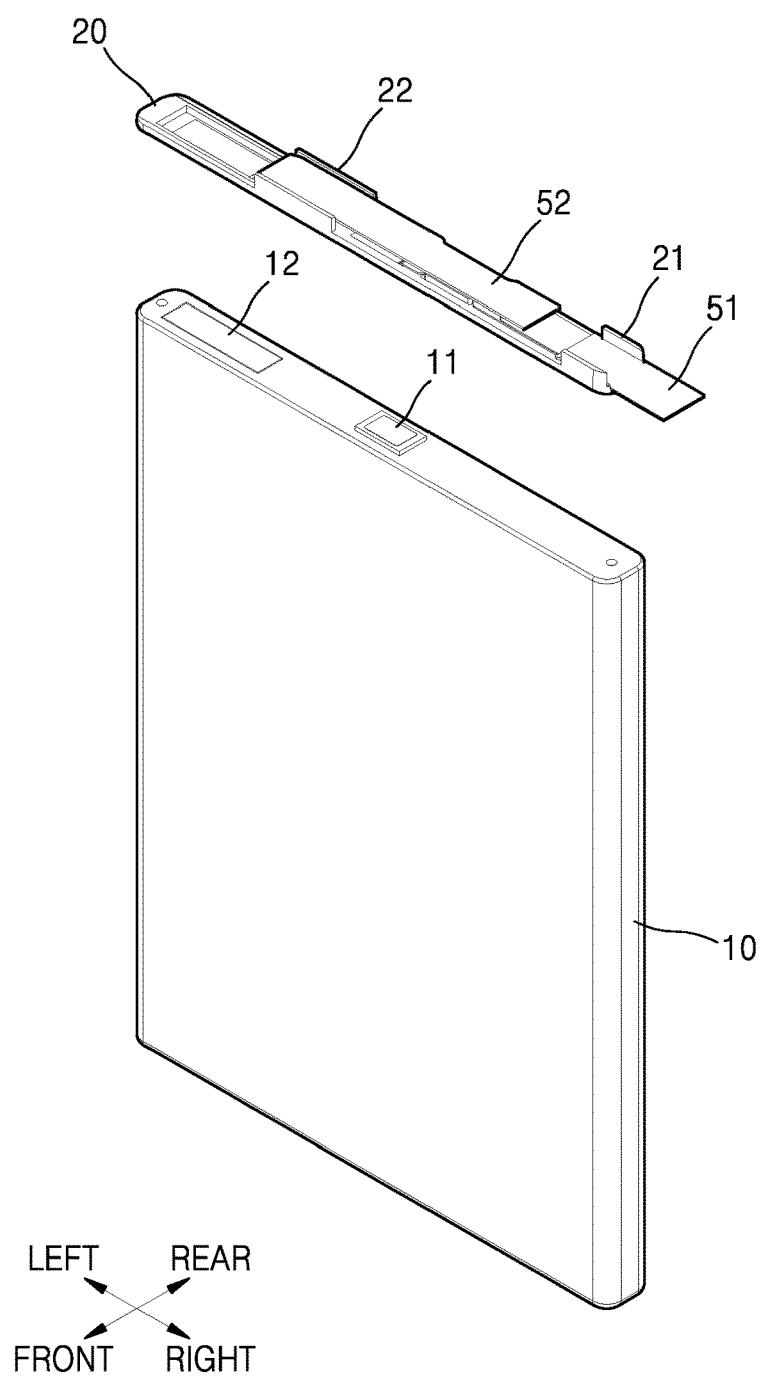
FIGS. 2 and 3 are exploded perspective views illustrating the secondary battery illustrated in FIG. 1.
Figure 3:
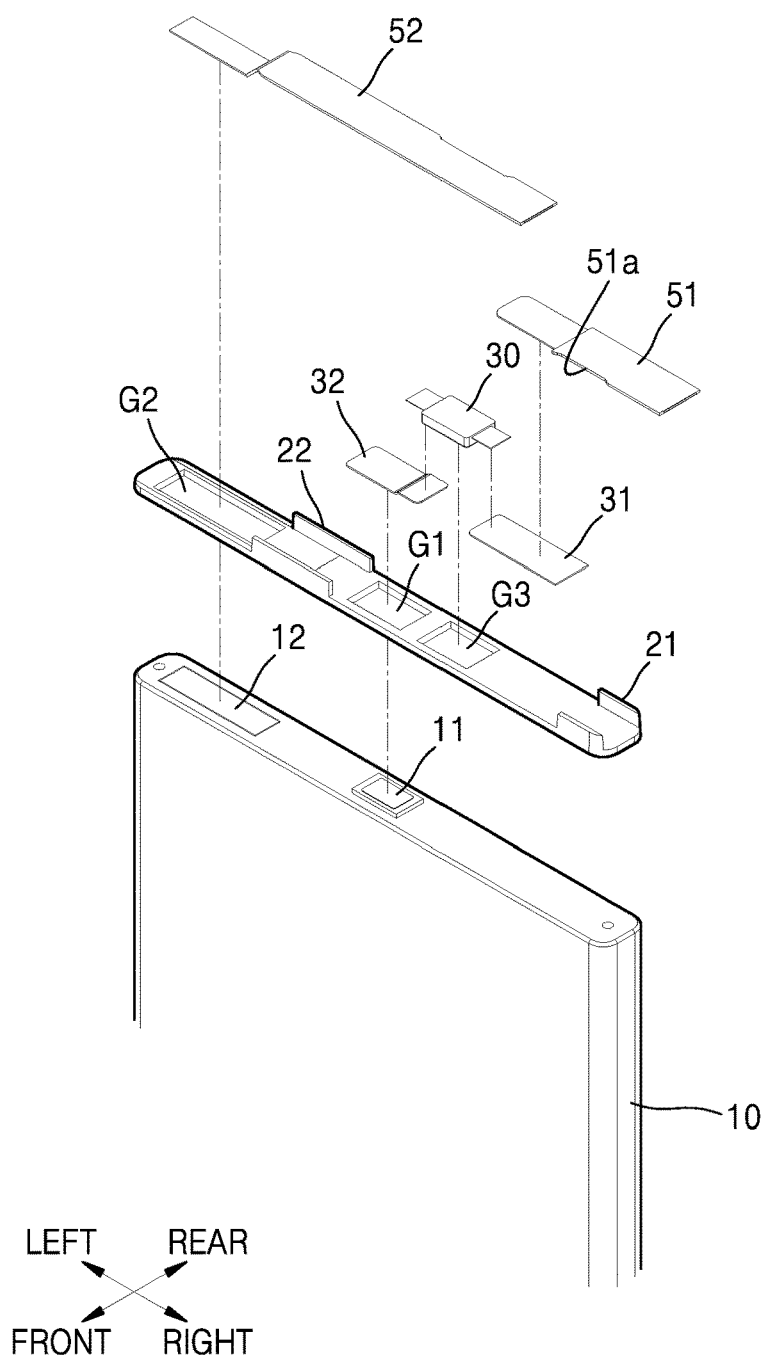
Figure 4:
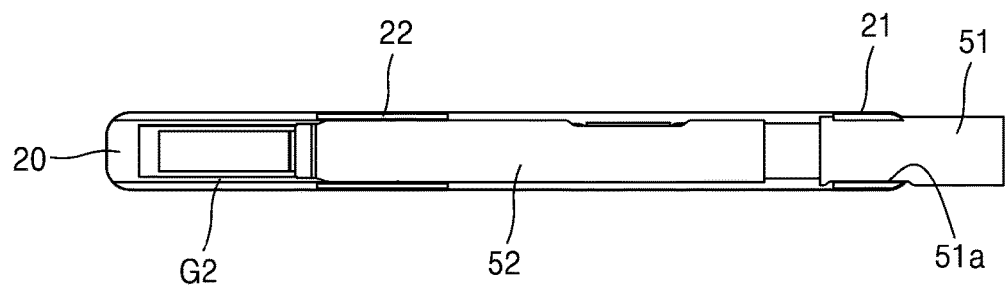
FIG. 4 is a plan view illustrating the secondary battery illustrated in FIG. 1.

FIG. 1 is a perspective view illustrating a secondary battery according to an exemplary embodiment. FIGS. 2 and 3 are exploded perspective views illustrating the secondary battery illustrated in FIG. 1. FIG. 4 is a plan view illustrating the secondary battery illustrated in FIG. 1.

Referring to FIGS. 1 to 3, the secondary battery includes a battery cell 10 including electrodes 11 and 12. The secondary battery also includes a cap cover 20 placed on the battery cell 10 and including first to third openings G1, G2, and G3 through which the electrodes 11 and 12 are exposed. The secondary battery further includes at least one connect member. The connection member can include first and second connection members 51 and 52 placed on the cap cover 20 and electrically connected to the electrodes 11 and 12. In addition, the secondary battery further includes at least one guide. The guide can include first and second guides or guide rails 21 and 22, protruding upward from the cap cover 20 and extending in a length direction of the connection members 51 and 52 for guiding the connection members 51 and 52.

The guides 21 and 22 can guide the connection members 51 and 52 so that the connection members 51 and 52 do not depart from assembling positions. The guides 21 and 22 can extend in the length direction of the connection members 51 and 52, for example, in a left-to-right direction.

The guides 21 and 22 can be formed as pairs on both sides of the cap cover 20 to receive the connection members 51 and 52 therebetween. The guides 21 and 22 can be formed as pairs on front and rear sides of the cap cover 20, and the connection members 51 and 52 can be placed between the guides 21 and 22 that are paired to face each other. Thus, the connection members 51 and 52 can be properly aligned and placed.

The guides 21 and 22 can include first guide 21 and second guide 22 that are separate from each other in the length direction of the connection members 51 and 52. The first and second guides 21 and 22 can be separate from each other by a predetermined length in the left-to-right direction in which the connection members 51 and 52 extend. The first and second guides 21 and 22 can be formed as pairs to receive different portions of the connection members 51 and 52 therebetween.

The first and second guides 21 and 22 can guide first and second connection members 51 and 52, and the first guides 21 or the second guide 22 can both guide the first and second connection members 51 and 52. For example, one of the first and second connection members 51 and 52, which is longer than the other, is guided by both the first and second guides 21 and 22 formed at different positions.

The connection members 51 and 52 can include the first and second connection members 51 and 52 electrically connected to first and second electrodes 11 and 12 of the battery cell 10, respectively. The first and second connection members 51 and 52 can connect the battery cell 10 to a protective circuit (not shown), thereby forming a charging and discharging current path. For example, ends of the first and second connection members 51 and 52 are placed close to the first and second electrodes 11 and 12 of the battery cell 10 for direct or indirect connection with the first and second electrodes 11 and 12, and the other ends of the first and second connection members 51 and 52 are connected to the protective circuit (not shown). The first and second connection members 51 and 52 can overlap each other on the cap cover 20 and extend substantially in parallel with each other within the guides 21 and 22.

In the exemplary embodiment shown in FIGS. 1 to 3, the first connection member 51 extends outwardly from the battery cell 10, and the second connection member 52 does not extend outwardly from the battery cell 10. However, the present disclosure is not limited thereto. For example, both the first and second connection members 51 and 52 extend outwardly from the battery cell 10 according to the position of the protective circuit (not shown). That is, the lengths of the first and second connection members 51 and 52 can vary according to positions at which the first and second connection members 51 and 52 are connected to the protective circuit (not shown).

In the exemplary embodiment shown in FIGS. 1 to 3, only one battery cell 10 is shown. However, the present disclosure is not limited thereto. That is, in other exemplary embodiments, two or more neighboring battery cells 10 are electrically connected to each other through connection members 51 and 52. For example, neighboring battery cells 10 are connected in series or parallel by electrically connecting connection members 51 and 52 extending from a battery cell 10 to electrodes 11 and 12 of another battery cell 10.

In some embodiments, the first connection member 51 is electrically connected to the first electrode 11 through a temperature-sensing element or temperature sensor 30. The temperature-sensing element 30 can be placed between the first electrode 11 and the first connection member 51 to form the charging and discharging current path.

Lead members 31 and 32 can be placed on both ends of the temperature-sensing element 30. For example, the lead member 32 is electrically connected to the first electrode 11 exposed upwardly through the first opening G1. The lead member 31 can be connected to the first connection member 51.

The third opening G3 can be formed through the cap cover 20 to expose the temperature-sensing element 30. The temperature-sensing element 30 can be placed close to the battery cell 10 for precisely measuring the temperature of the battery cell 10. For example, the third opening G3 is formed through the cap cover 20 to expose the temperature-sensing element 30 to a surface of the battery cell 10.

The first and second openings G1 and G2 can be formed through the cap cover 20 to respectively expose the first and second electrodes 11 and 12. The first and second electrodes 11 and 12 can be respectively connected to the first and second connection members 51 and 52. In addition, the third opening G3 can be formed through the cap cover 20 to expose the temperature-sensing element 30.

The formation positions of the guides 21 and 22 will now be described in more detail. The first guides 21 can be formed between the third opening G3 and an end portion of the cap cover 20. As shown in FIGS. 1 to 3, the first guide 21 can be formed on the end portion of the cap cover 20.

The first guide 21 can guide the first connection member 51 to an assembling position. For example, the first connection member 51 extends from the temperature-sensing element 30 placed in the third opening G3 to the end portion of the cap cover 20, and the position of the first connection member 51 is guided by the first guide 21 formed between the third opening G3 and the end portion of the cap cover 20.

The first guide 21 can guide the second connection member 52 as well as the first connection member 51. For example, the second connection member 52 extends from the second electrode 12 to the outside of the battery cell 10 through the end portion of the cap cover 20, and the first guide 21 formed on the end portion of the cap cover 20 confines the second connection member 52. For example, the second connection member 52 is placed on top of the first connection member 51 in an overlapping manner, and the first and second connection members 51 and 52 are confined by the first guide 21.

The second guide 22 can be formed between the first and second openings G1 and G2. For example, the second guide 22 guides the second connection member 52.

In some embodiments, the guides 21 and 22 are provided to restrict the connection members 51 and 52 to assembling positions. For example, the battery cell 10 is electrically connected to the connection members 51 and 52 by performing a thermal joining process such as welding on a plurality of positions. For example, to electrically connect the first electrode 11 to the first connection member 51 through the temperature-sensing element 30, the lead member 32 placed on an end of the temperature-sensing element 30 can be welded to the first electrode 11, or the lead member 31 placed on the end of the temperature-sensing element 30 can be welded to the first connection member 51. In addition, the second electrode 12 and the second connection member 52 can be connected to each other by a thermal joining process such as welding.

During such a thermal joining process, the positions of the first and second connection members 51 and 52 can change. For example, the first and second connection members 51 and 52 depart from assembling positions when a welding electrode (not shown) touches or impacts the first and second connection members 51 and 52. To prevent this, typically, the first and second connection members 51 and 52 are fixed using insulation tape (not shown), and a welding process is performed. In this case, however, an additional process is necessary to attach insulation tape (not shown), and it can be inconvenient to attach many pieces of insulation tape (not shown) to many positions.

However, according to some embodiments, since the guides 21 and 22 restrict the connection members 51 and 52 to proper positions, inconvenient processes such as an insulation tape attaching process are unnecessary. For example, insulation tape (not shown) for fixing the connection members 51 and 52 is not used, but insulation tape can still be used as an insulation material in other areas. Thus, assembling processes can be simplified.

Referring to FIG. 4, at least one recess 51a is formed on lateral sides of the first connection member 51, and the first guide 21 is engaged with the recess 51a. In addition, recesses (not shown) can be formed on lateral sides of the second connection member 52, and the second guide 22 can be engaged with the recesses.

The guides 21 and 22 can be formed on both sides of the cap cover 20, and the connection members 51 and 52 can be placed between the guides 21 and 22 such that the widths of the connection members 51 and 52 are confined by the guides 21 and 22. Although the widths of the connection members 51 and 52 are confined as described above, the widths of the connection members 51 and 52 can be increased by forming the recess 51a at positions corresponding to the guides 21 and 22 to prevent interference with the guides 21 and 22. The guides 21 and 22 and the recess 51a can match each other and can be aligned with each other.

Since the connection members 51 and 52 are placed between the battery cell 10 and the protective circuit (not shown) to form the charging and discharging current path, if the connection members 51 and 52 are wide, the resistance of the charging and discharging current path can be decreased.

The connection members 51 and 52 can include conductive patterns (not shown) for forming current paths, and insulation coatings (not shown) for insulating the conductive patterns. In some embodiments, the connection members 51 and 52 refer to any members that are able to be electrically connected to the battery cell 10 for forming the charging and discharging current path. For example, the connection members 51 and 52 include tabs, coverlays, plates, terminals, etc.

As described above, according to at least one of the disclosed embodiments, since the guides 21 and 22 are formed to guide the connection members 51 and 52 electrically connected to the battery cell 10, although a welding electrode physically touches or impacts the connection members 51 and 52, the connection members 51 and 52 do not depart from assembling positions.

In addition, due to the guides 21 and 22 confining the connection members 51 and 52, inconvenient processes such as a tape attaching process are not necessary.

It should be understood that the exemplary embodiments described herein should be considered in a descriptive sense only and not for purposes of limitation. Descriptions of features or aspects within each exemplary embodiment should typically be considered as available for other similar features or aspects in other exemplary embodiments.

While the inventive technology has been described with reference to the figures, it will be understood by those of ordinary skill in the art that various changes in form and details can be made therein without departing from the spirit and scope as defined by the following claims.

What is claimed is:

1. A secondary battery comprising:
   a battery cell including an electrode;
   a cap cover placed over the battery cell and having an opening that exposes the electrode;
   a connection member placed over the cap cover and electrically connected to the electrode, wherein the connection member covers the opening of the cap cover; and
   at least one guide accommodating the connection member, wherein the guide protrudes upwardly from the cap cover and extends in a length direction of the connection member.

2. The secondary battery of claim 1, wherein the guide is formed on opposing sides of the cap cover so as to accommodate the connection member therebetween.

3. The secondary battery of claim 1, wherein the guides comprise a plurality of first guides and a plurality of second guides that are respectively separate from each other in the length direction of the connection member.

4. The secondary battery of claim 1, wherein the connection member has lateral sides having at least one recess facing the guide such that the recess and the guide are engaged with each other.

5. The secondary battery of claim 1, wherein the battery cell has an upper surface, and wherein the electrode comprises first and second electrodes formed over the upper surface and having different polarities.

6. The secondary battery of claim 5, wherein the connection member comprises first and second connection members electrically connected to the first and second electrodes, respectively.

7. The secondary battery of claim 6, wherein the first and second connection members overlap each other and extend in parallel with each other.

8. The secondary battery of claim 6, wherein the guide is formed on opposing sides of the cap cover so as to accommodate at least one of the first and second connection members therebetween.

9. The secondary battery of claim 6, wherein the opening comprises first and second openings that respectively expose the first and second electrodes.

10. The secondary battery of claim 9, further comprising a temperature sensor placed between the first electrode and the first connection member, wherein the cap cover has a third opening that exposes the temperature sensor.

11. The secondary battery of claim 10, wherein the cap cover includes an end portion, and wherein the guide comprises:
    at least one first guide formed between the third opening and the end portion of the cap cover; and
    at least one second guide formed between the first and second openings.

12. The secondary battery of claim 11, wherein the first guide accommodates the first connection member electrically connected to the temperature sensor, and
    wherein the second guide accommodates the second connection member electrically connected to the second electrode exposed through the second opening.

13. The secondary battery of claim 12, wherein the first guide further accommodates the second connection member.

14. A secondary battery comprising:
    a battery cell including an electrode;
    a cap cover placed over the battery cell and having an opening that exposes the electrode, wherein the cap cover includes at least one guide protruding upwardly from the cap cover and extending in a length direction of the cap cover;
    at least one connection member placed over the cap cover and electrically connected to the electrode, wherein the connection member is at least partially accommodated in and supported by the guide, and wherein the connection member covers the opening of the cap cover.

15. The secondary battery of claim 14, wherein the cap cover includes first and second surfaces opposing each other, wherein the first surface faces the battery cell, and wherein the guide includes a plurality of guides spaced part from each other.

16. The secondary battery of claim 14, wherein the guide includes a first pair of guides and a second pair of guides spaced apart from each other.

17. The secondary battery of claim 16, wherein the length of the second pair of guides is greater than that of the first pair of guides.

18. The secondary battery of claim 16, wherein the connection member comprises first and second connection members spaced apart from each other and respectively supported by the first and second pairs of guides.

19. The secondary battery of claim 16, wherein at least one opening is formed between the first and second pairs of guides.

20. The secondary battery of claim 14, wherein the connection member has at least one recess facing the guide such that the recess and the guide are engaged with each other.

21. The secondary battery of claim 1, wherein the at least one guide comprises a plurality of guide members, and wherein the connection member passes through at least one of the guide members.

22. The secondary battery of claim 21, wherein the connection member comprises a plurality of connection members, wherein at least two of the connection members overlap each other in the height dimension of the secondary battery.

23. The secondary battery of claim 21, wherein the opening comprises first, second and third openings, and wherein the first and third openings are positioned between two of the guide members.

24. The secondary battery of claim 23, wherein the connection member covers both the first and third openings.

\* \* \* \* \*